United States Patent
Saitwal et al.

(10) Patent No.: US 9,232,140 B2
(45) Date of Patent: Jan. 5, 2016

(54) IMAGE STABILIZATION TECHNIQUES FOR VIDEO SURVEILLANCE SYSTEMS

(71) Applicant: Behavioral Recognition Systems, Inc., Houston, TX (US)

(72) Inventors: Kishor Adinath Saitwal, Pearland, TX (US); Wesley Kenneth Cobb, The Woodlands, TX (US); Tao Yang, Katy, TX (US)

(73) Assignee: BEHAVIORAL RECOGNITION SYSTEMS, INC., Houston, TX (US)

( * ) Notice: Subject to any disclaimer, the term of this patent is extended or adjusted under 35 U.S.C. 154(b) by 75 days.

(21) Appl. No.: 14/077,097

(22) Filed: Nov. 11, 2013

(65) Prior Publication Data
US 2014/0132786 A1    May 15, 2014

Related U.S. Application Data

(60) Provisional application No. 61/725,420, filed on Nov. 12, 2012.

(51) Int. Cl.
*H04N 5/232*  (2006.01)
*G06T 7/20*   (2006.01)

(52) U.S. Cl.
CPC .......... *H04N 5/23267* (2013.01); *G06T 7/204* (2013.01); *H04N 5/23254* (2013.01)

(58) Field of Classification Search
CPC .......... H04N 5/23254; H04N 5/23267; G06T 3/0068; G06T 3/0075; G06T 7/0022; G06T 7/0024; G06T 7/0026; G06T 7/0028; G06T 7/003; G06T 7/0032; G06T 7/0038
See application file for complete search history.

(56) References Cited

U.S. PATENT DOCUMENTS

| 4,679,077 A | 7/1987 | Yuasa et al. |
| 5,113,507 A | 5/1992 | Jaeckel |
| 5,748,775 A | 5/1998 | Tsuchikawa et al. |
| 5,751,378 A | 5/1998 | Chen et al. |

(Continued)

FOREIGN PATENT DOCUMENTS

| KR | 20020048504 A | 6/2002 |
| WO | 2009049314 A2 | 4/2009 |

OTHER PUBLICATIONS

Pan et al., "Selective Object Stabilization for Home Video Consumers", Nov. 2005, IEEE Transactions on Consumer Electronics, vol. 51, No. 4, pp. 1074-1084.*

(Continued)

*Primary Examiner* — Timothy J Henn
(74) *Attorney, Agent, or Firm* — Patterson & Sheridan, LLP

(57) ABSTRACT

A behavioral recognition system may include both a computer vision engine and a machine learning engine configured to observe and learn patterns of behavior in video data. Certain embodiments may provide image stabilization of a video stream obtained from a camera. An image stabilization module in the behavioral recognition system obtains a reference image from the video stream. The image stabilization module identifies alignment regions within the reference image based on the regions of the image that are dense with features. Upon determining that the tracked features of a current image is out of alignment with the reference image, the image stabilization module uses the most feature dense alignment region to estimate an affine transformation matrix to apply to the entire current image to warp the image into proper alignment.

23 Claims, 4 Drawing Sheets

(56) References Cited

U.S. PATENT DOCUMENTS

| | | | |
|---|---|---|---|
| 5,969,755 A | 10/1999 | Courtney | |
| 6,252,974 B1 | 6/2001 | Martens et al. | |
| 6,263,088 B1 | 7/2001 | Crabtree et al. | |
| 6,285,711 B1* | 9/2001 | Ratakonda et al. | 375/240.16 |
| 6,567,564 B1* | 5/2003 | van der Wal | 382/260 |
| 6,570,608 B1 | 5/2003 | Tserng | |
| 6,661,918 B1 | 12/2003 | Gordon et al. | |
| 6,674,877 B1 | 1/2004 | Jojic et al. | |
| 6,678,413 B1 | 1/2004 | Liang et al. | |
| 6,856,249 B2 | 2/2005 | Strubbe et al. | |
| 6,940,998 B2 | 9/2005 | Garoutte | |
| 7,076,102 B2 | 7/2006 | Lin et al. | |
| 7,136,525 B1 | 11/2006 | Toyama et al. | |
| 7,158,680 B2 | 1/2007 | Pace | |
| 7,200,266 B2 | 4/2007 | Ozer et al. | |
| 7,227,893 B1 | 6/2007 | Srinivasa et al. | |
| 7,436,887 B2 | 10/2008 | Yeredor et al. | |
| 7,460,730 B2* | 12/2008 | Pal et al. | 382/284 |
| 7,773,828 B2* | 8/2010 | Sakata et al. | 382/294 |
| 7,825,954 B2 | 11/2010 | Zhang et al. | |
| 7,868,912 B2 | 1/2011 | Venetianer et al. | |
| 8,520,085 B2* | 8/2013 | Chen et al. | 348/208.99 |
| 8,675,997 B2* | 3/2014 | Zuniga et al. | 382/294 |
| 2003/0107650 A1 | 6/2003 | Colmenarez et al. | |
| 2003/0228058 A1 | 12/2003 | Xie et al. | |
| 2004/0001705 A1* | 1/2004 | Soupliotis et al. | 386/117 |
| 2004/0151342 A1 | 8/2004 | Venetianer et al. | |
| 2005/0001759 A1 | 1/2005 | Khosla | |
| 2005/0105765 A1 | 5/2005 | Han et al. | |
| 2005/0240629 A1 | 10/2005 | Gu et al. | |
| 2006/0018516 A1 | 1/2006 | Masoud et al. | |
| 2006/0138338 A1 | 6/2006 | Tezuka et al. | |
| 2006/0165386 A1 | 7/2006 | Garoutte | |
| 2006/0187359 A1 | 8/2006 | Soupliotis et al. | |
| 2006/0190419 A1 | 8/2006 | Bunn et al. | |
| 2006/0193516 A1 | 8/2006 | Toyama et al. | |
| 2006/0222206 A1 | 10/2006 | Garoutte | |
| 2007/0250898 A1 | 10/2007 | Scanlon et al. | |
| 2008/0002856 A1 | 1/2008 | Ma et al. | |
| 2008/0181453 A1 | 7/2008 | Xu et al. | |
| 2008/0181499 A1 | 7/2008 | Yang et al. | |
| 2008/0193010 A1 | 8/2008 | Eaton et al. | |
| 2008/0240496 A1 | 10/2008 | Senior | |
| 2008/0247599 A1 | 10/2008 | Porikli et al. | |
| 2008/0252723 A1 | 10/2008 | Park | |
| 2009/0022364 A1 | 1/2009 | Swaminathan et al. | |
| 2009/0067716 A1 | 3/2009 | Brown et al. | |
| 2009/0210367 A1 | 8/2009 | Armstrong et al. | |
| 2009/0297023 A1 | 12/2009 | Lipton et al. | |
| 2009/0324107 A1 | 12/2009 | Walch | |
| 2010/0053347 A1* | 3/2010 | Agarwala et al. | 348/208.99 |
| 2010/0063949 A1 | 3/2010 | Eaton et al. | |
| 2010/0150471 A1 | 6/2010 | Cobb et al. | |
| 2010/0157070 A1* | 6/2010 | Mohanty et al. | 348/208.1 |
| 2010/0246675 A1 | 9/2010 | Gharavi-Alkhansari et al. | |
| 2010/0322516 A1 | 12/2010 | Xu et al. | |
| 2010/0328486 A1 | 12/2010 | Steinberg et al. | |
| 2012/0162449 A1* | 6/2012 | Braun et al. | 348/208.4 |
| 2012/0162454 A1* | 6/2012 | Park et al. | 348/208.6 |
| 2013/0177228 A1* | 7/2013 | Fan et al. | 382/131 |
| 2014/0003710 A1* | 1/2014 | Seow et al. | 382/159 |

OTHER PUBLICATIONS del-Blanco et al., "Automatic Feature-Based Stablization of Video with Intentional Motion through a Particle Filter", 2008.*

J. Connell et al., "Detection and Tracking in the IBM PeopleVision System," IEEE ICME, Jun. 2004: pp. 1-4, <http://www.research.ibm.com/peoplevision>.

Helmut Grabner et al., "On-line Boosting and Vision," IEEE Conference on Computer Vision and Pattern Recognition (CVPR), 2006, vol. 1: pp. 260-267.

Ismail Haritaoglu et al., "Ghost: A Human Body Part Labeling System Using Silhouettes," 14th Annual International Conference on Pattern Recognition, Aug. 1998: pp. 77-82.

Richard Nock et al., "Statistical Region Merging," IEEE Transactions on Pattern Analysis and Machine Intelligence, Nov. 2004, vol. 26(11): pp. 1452-1458.

Apewokin et al. "Multimodal Mean Adaptive Backgrounding for Embedded Real-Time Video Surveillance," Jun. 2007, IEEE 6 pages. Minneapolis, MN US.

Elgammal et al. "Non-parametric Model for Background Substraction," Computer Vision Laboratory, University of Maryland; Jun. 2000; 17 pages, College Park, MD US.

Haritaogul et al. "W4: Real-Time Surveillance of People and Their Activities," IEEE Transactions on Pattern Analysis and Machine Intelligence, Aug. 2000; vol. 22, No. 8; pp. 809-830.

Ivanov et al. "Video Surveillance of Interactions," MIT Media Laboratory, Cambridge, MA, Jul. 1999; 8 pages, Fort Collins, CO US.

Chris Stauffer et al., "Adaptive background mixture models for real-time tracking," Proceedings IEEE Conference on Computer Vision and Pattern Recognition, 1999: pp. 246-252.

Pentti Kanerva "Sparse Distributed memory and Related Models," M.H. Hassoun, ed., Associative Neural Memories: Theory and Implementation, 1993, pp. 50-76. New York: Oxford University Press.

Senior et al. "Appearance Models for Occlusion Handling," IBM T.J. Watson Research Center, 2001, 8 pages, Yorktown, Heights, NY US.

Chris Stauffer et al., "Learning Patterns of Activity Using Real-Time Tracking," IEEE Transactions on Pattern Analysis and Machine Intelligence (TPAMI), Aug. 2000, vol. 22(8): 747-757.

International Search Report for Application No. PCT/US2013/069508 dated Jan. 29, 2014.

* cited by examiner

IMAGE STABILIZATION TECHNIQUES FOR VIDEO SURVEILLANCE SYSTEMS

CROSS-REFERENCE TO RELATED APPLICATIONS

This application claims priority to U.S. provisional application having Ser. No. 61/725,420, filed on Nov. 12, 2012.

BACKGROUND

1. Technical Field

Embodiments presented herein disclose techniques for analyzing a sequence of video frames. More particularly, embodiments provide techniques for stabilizing camera images captured by a video surveillance system.

2. Description of the Related Art

Some currently available video surveillance systems provide simple object recognition capabilities. For example, a video surveillance system may be configured to classify a group of pixels (referred to as a "blob") in a given frame as being a particular object (e.g., a person or vehicle). Once identified, a "blob" may be tracked from frame-to-frame in order to follow the "blob" moving through the scene over time, e.g., a person walking across the field of vision of a video surveillance camera. Further, such systems may be configured to determine when an object has engaged in certain predefined behaviors. For example, the system may include definitions used to recognize the occurrence of a number of pre-defined events, e.g., the system may evaluate the appearance of an object classified as depicting a car (a vehicle-appear event) coming to a stop over a number of frames (a vehicle-stop event). Thereafter, a new foreground object may appear and be classified as a person (a person-appear event) and the person then walks out of frame (a person-disappear event). Further, the system may be able to recognize the combination of the first two events as a "parking-event."

However, such surveillance systems typically require that the objects and/or behaviors which may be recognized by the system to be defined in advance. Thus, in practice, these systems rely on predefined definitions for objects and/or behaviors to evaluate a video sequence. Unless the underlying system includes a description for a particular object or behavior, the system is generally incapable of recognizing that behavior (or at least instances of the pattern describing the particular object or behavior). More generally, such systems are often unable to identify objects, events, behaviors, or patterns (or classify such objects, events, behaviors, etc., as being normal or anomalous) by observing what happens in the scene over time; instead, such systems rely on static patterns defined in advance.

SUMMARY

One embodiment presented herein includes a method for stabilizing camera images captured by a video recording device and evaluated by a video analytics application. The method generally includes identifying candidate regions within a reference frame to use in aligning a stream of frames captured by a video camera. The candidate regions are sorted in descending order by a density of tracked features within each candidate region. The method also includes designating a candidate region having a highest density of tracked features among the candidate regions as an alignment region for each captured frame. Upon determining that the stream is unstable based on the tracked features in a current frame being misaligned relative to the corresponding features of the reference frame, an affine transformation matrix for the current frame based on the alignment region is determined. Further, the current frame is warped using the affine transformation matrix such that the features in the alignment region of the current frame match the corresponding features of the reference frame. Additionally, a registration error is identified between the warped current frame and the reference frame, and upon determining that the registration error is within a tolerance threshold, the warped current frame is designated as a stabilized frame.

Another embodiment presented herein includes a method for stabilizing camera images captured by a video recording device. The method generally includes identifying candidate regions within a reference frame to use in aligning a frame captured by a video camera. The candidate regions are sorted in descending order by a density of tracked features within each candidate region. The method also generally includes designating a candidate region having a highest density of tracked features among the candidate regions as an alignment region for each captured frame. Upon determining that the stream is unstable based on the tracked features in a current frame being misaligned relative to the corresponding features of the reference frame, the current frame is aligned.

Other embodiments include, without limitation, a computer-readable medium that includes instructions that enable a processing unit to implement one or more aspects of the disclosed methods as well as a system having a processor, memory, and application programs configured to implement one or more aspects of the disclosed methods.

BRIEF DESCRIPTION OF THE DRAWINGS

So that the manner in which the above recited features, advantages, and objects of the present invention are attained and can be understood in detail, a more particular description of the invention, briefly summarized above, may be had by reference to the embodiments illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
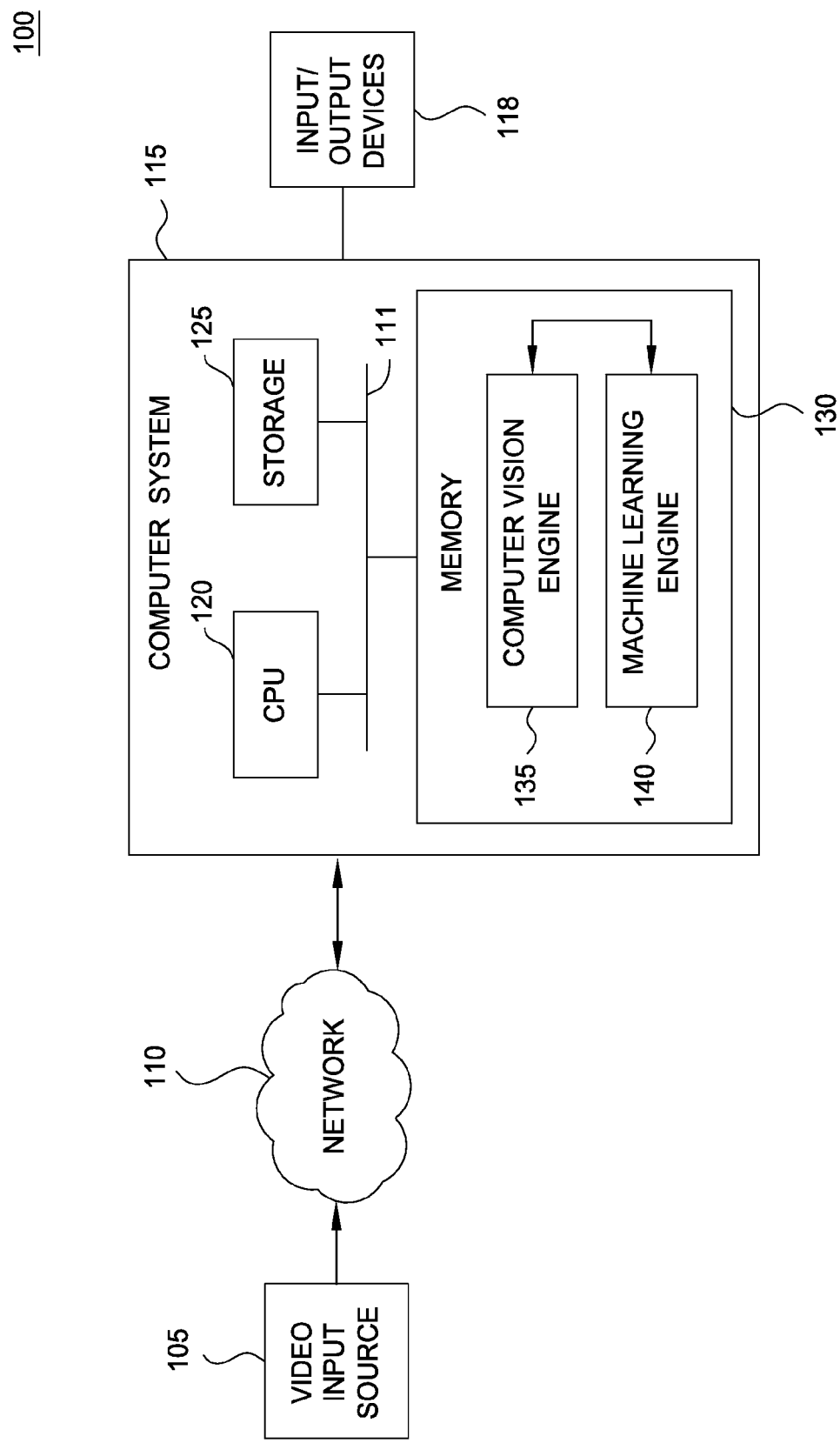
FIG. 1 illustrates components of a video analysis system, according to one embodiment.

Embodiments presented herein disclose a method and a system for analyzing an acquired stream of video frames to identify when a video frame is misaligned. Once a misaligned frame is detected, a behavioral recognition-based video surveillance system may align the frame.

A behavioral recognition system may be configured to learn, identify, and recognize patterns of behavior by observing a sequence of individual frames, otherwise known as a video stream. Unlike a rules-based video surveillance system, which contains predefined patterns of what to identify, the behavioral recognition system disclosed herein learns patterns by generalizing input and building memories of what is observed. Over time, the behavioral recognition system uses these memories to distinguish between normal and anomalous behavior within the field of view captured within a video stream. Generally this field of view is referred to as the "scene."

In one embodiment, the behavioral recognition system includes a computer vision engine and a machine learning engine. The computer vision engine may be configured to process a scene, generate information streams characterizing observed activity, and then pass the streams to the machine learning engine. In turn, the machine learning engine may be configured to learn object behaviors in that scene. In addition to learning-based behavior, a machine learning engine may be configured to build models of certain behaviors within a scene and determine whether observations indicate that the behavior of an object is anomalous, relative to the model.

Frequently, an otherwise stationary video camera may be subject to some physical motion as it captures a scene. For example, a camera trained to observe a subway station may experience a slight bounce as trains enter and exit the station. Similarly, an outdoor camera may have some slight motion in response to wind. In such cases, the scene captured the camera may be disturbed, perturbed, or slightly jostled as the camera moves up and down. As a result, the images can be distorted or altered in a variety of complex manners, e.g., translated, rotated, shorn, and the like.

Without correction, the results of this minor movement can disrupt the video computer vision engine. For example, consider a portion of the scene depicting background, while the background remains unchanged, the position of elements in the background changes in response to camera moving. If the movement results in sufficiently distinct pixel values in a current frame, the computer vision engine may inadvertently identify spurious foreground objects, i.e., objects that are not truly foreground nevertheless being characterized as such. Further, these spurious objects are passed to further elements in the processing pipeline discussed above and can degrade the quality of the machine learning, and ultimately, lead to spurious alerts.

To address this issue, in one embodiment, the computer vision engine may be configured to identify when a scene is misaligned and perform a method to align the received frame. Doing so helps provide a consistent image for use by both the computer vision engine and the machine learning engine.

In the following, reference may be made to embodiments of the invention. However, it should be understood that the invention is not limited to any specifically described embodiment. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment is implemented as a program product for use with a computer system. The program(s) of the program product defines functions of the embodiments (including the methods described herein) and can be contained on a variety of computer-readable storage media. Examples of computer-readable storage media include (i) non-writable storage media (e.g., read-only memory devices within a computer such as CD-ROM or DVD-ROM disks readable by an optical media drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other examples media include communications media through which information is conveyed to a computer, such as through a computer or telephone network, including wireless communications networks.

In general, the routines executed to implement the embodiments may be part of an operating system or a specific application, component, program, module, object, or sequence of instructions. The computer program is comprised typically of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment. However, it should be appreciated that any particular program nomenclature that follows is used merely for convenience, and thus the invention should not be limited to use solely in any specific application identified and/or implied by such nomenclature.

FIG. 1 illustrates components of a video analysis and behavioral recognition system 100, according to one embodiment. As shown, the behavioral recognition system 100 includes a video input source 105, a network 110, a computer system 115, and input and output devices 118 (e.g., a monitor, a keyboard, a mouse, a printer, and the like). The network 110 may transmit video data recorded by the video input 105 to the computer system 115. Illustratively, the computer system 115 includes a CPU 120, storage 125 (e.g., a disk drive, optical disk drive, and the like), and a memory 130 containing both a computer vision engine 135 and a machine learning engine 140. As described in greater detail below, the computer vision engine 135 and the machine learning engine 140 may provide software applications configured to analyze a sequence of video frames provided by the video input 105.

Network 110 receives video data (e.g., video stream(s), video images, or the like) from the video input source 105. The video input source 105 may be a video camera, a VCR, DVR, DVD, computer, web-cam device, or the like. For example, the video input source 105 may be a stationary video camera aimed at a certain area (e.g., a subway station, a parking lot, a building entry/exit, etc.), which records the events taking place therein. Generally, the area within the camera's field of view is referred to as the scene. The video input source 105 may be configured to record the scene as a sequence of individual video frames at a specified frame-rate (e.g., 24 frames per second), where each frame includes a fixed number of pixels (e.g., 320×240). Each pixel of each frame may specify a color value (e.g., an RGB value) or grayscale value (e.g., a radiance value between 0-255). Further, the video stream may be formatted using known such formats e.g., MPEG2, MJPEG, MPEG4, H.263, H.264, and the like.

As noted, the computer vision engine 135 may be configured to analyze this raw information to identify active objects in the video stream, detect misaligned camera images, identify a variety of appearance and kinematic features used by a machine learning engine 140 to derive object classifications, derive a variety of metadata regarding the actions and interactions of such objects, and supply this information to the machine learning engine 140. And in turn, the machine learning engine 140 may be configured to evaluate, observe, learn and remember details regarding events (and types of events) that transpire within the scene over time.

In one embodiment, the machine learning engine 140 receives the data generated by the computer vision engine 135. The machine learning engine 140 may be configured to analyze the received data, cluster objects having similar visual and/or kinematic features, build semantic representations of events depicted in the video frames. Over time, the machine learning engine 140 learns expected patterns of behavior for objects that map to a given cluster. Thus, over time, the machine learning engine learns from these observed patterns to identify normal and/or abnormal events. That is, rather than having patterns, objects, object types, or activities defined in advance, the machine learning engine 140 builds its own model of what different object types have been observed (e.g., based on clusters of kinematic and/or appearance features) as well as a model of expected behavior for a given object type. Thereafter, the machine learning engine can decide whether the behavior of an observed event is anomalous or not based on prior learning.

Data describing whether a normal/abnormal behavior/event has been determined and/or what such behavior/event is may be provided to output devices 118 to issue alerts, for example, an alert message presented on a GUI interface screen.

In general, the computer vision engine 135 process video data, i.e., the sequence of frames captured by the camera, in real-time. However, time scales for processing information by the computer vision engine 135 and the machine learning engine 140 may differ. For example, in one embodiment, the computer vision engine 135 processes the received video data frame-by-frame, while the machine learning engine 140 processes data characterizing every N-frames. In other words, while the computer vision engine 135 may analyze each frame in real-time to derive a set of kinematic and appearance data related to objects observed in the frame, the machine learning engine 140 is not constrained by the real-time frame rate of the video input.

Note, however, FIG. 1 illustrates merely one possible arrangement of the behavior recognition system 100. For example, although the video input source 105 is shown connected to the computer system 115 via the network 110, the network 110 is not always present or needed (e.g., the video input source 105 may be directly connected to the computer system 115). Further, various components and modules of the behavior recognition system 100 may be implemented in other systems. For example, in one embodiment, the computer vision engine 135 may be implemented as a part of a video input device (e.g., as a firmware component wired directly into a video camera). In such a case, the output of the video camera may be provided to the machine learning engine 140 for analysis. Similarly, the output from the computer vision engine 135 and machine learning engine 140 may be supplied over computer network 110 to other computer systems. For example, the computer vision engine 135 and machine learning engine 140 may be installed on a server system and configured to process video from multiple input sources (i.e., from multiple cameras). In such a case, a client application 250 running on another computer system may request (or receive) the results of over network 110.

Figure 2:
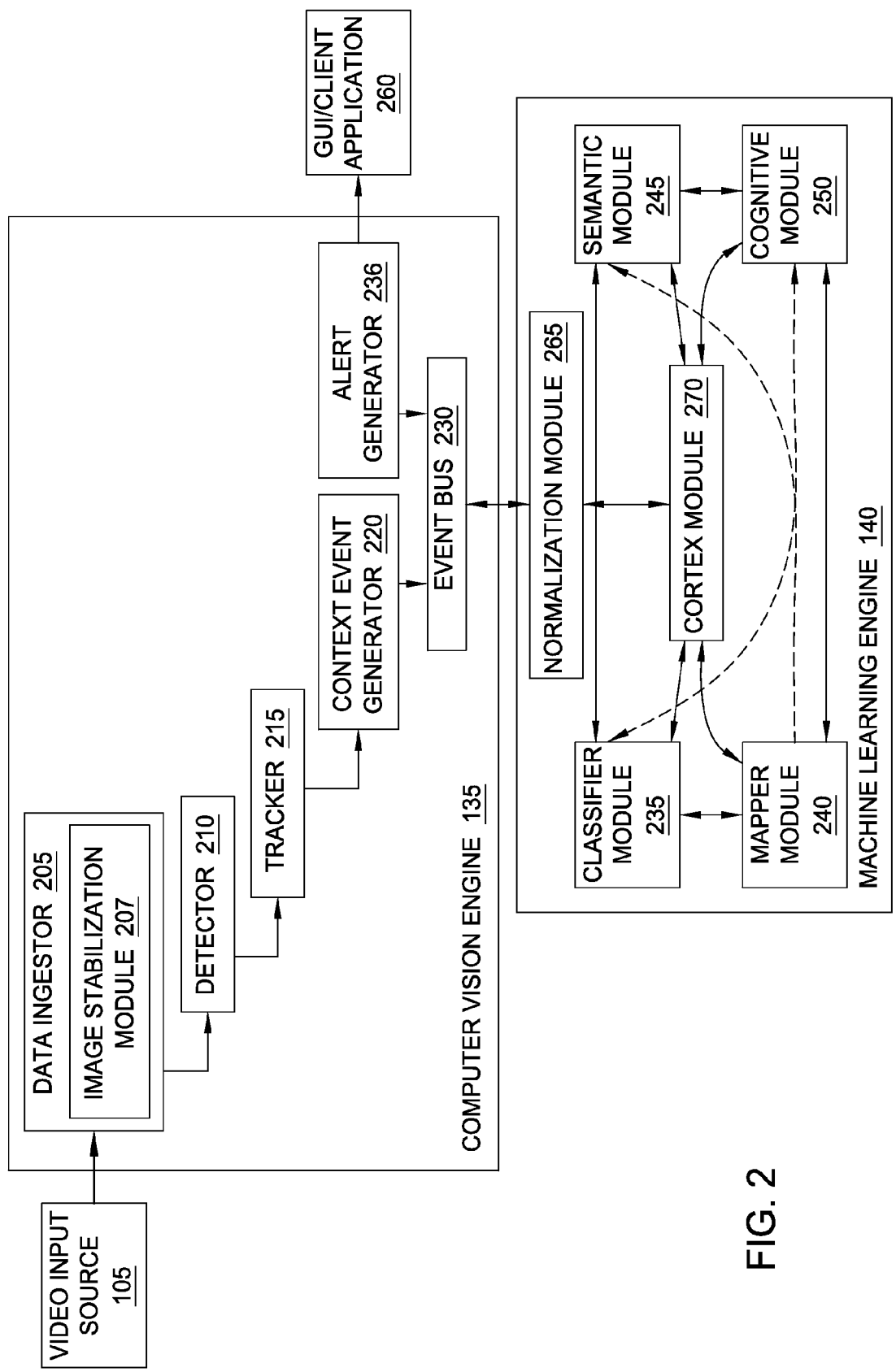
FIG. 2 further illustrates components of the video analysis system shown in FIG. 1, according to one embodiment.

FIG. 2 further illustrates components of the computer vision engine 135 and the machine learning engine 140 first illustrated in FIG. 1, according to one embodiment. As shown, the computer vision engine 135 includes a data ingestor 205, a detector 215, a tracker 215, a context event generator 220, an alert generator 225, and an event bus 230. Collectively, the components 205, 210, 215, and 220 provide a pipeline for processing an incoming sequence of video frames supplied by the video input source 105 (indicated by the solid arrows linking the components). In one embodiment, the components 210, 215, and 220 may each provide a software module configured to provide the functions described herein. Of course, one of ordinary skill in the art will recognize that the components 205, 210, 215, and 220 may be combined (or further subdivided) to suit the needs of a particular case and further that additional components may be added (or some may be removed) from a video surveillance system.

In one embodiment, the data ingestor 205 receives raw video input from the video input source 105. The data ingestor 205 may be configured to preprocess the input data before sending it to the detector 210. For example, the data ingestor 205 may be configured to separate each frame of video provided into a stationary or static part (the scene background) and a collection of volatile parts (the scene foreground). The frame itself may include a two-dimensional array of pixel values for multiple channels (e.g., RGB channels for color video or grayscale channel or radiance channel for black and white video).

The data ingestor 205 may include an image stabilization module 207. In one embodiment, the image stabilization module 207 is configured to evaluate images captured by the video camera to determine whether the images need to be stabilized due to camera movement, prior to separating the image into background and foreground objects. To do so, the image stabilization module 207 may generate a reference image against which stability of a current image is evaluated. For example, in one embodiment, the first raw camera image is used to begin stabilization. Alternatively, the current background image may be used. The reference image may be updated periodically, e.g., every five minutes.

Once the reference image is determined, the image stabilization module 207 may determine a set of alignment regions. For example, the image stabilization module may identify a set of feature rich areas (e.g., an 80×80 pixel grid) in the reference image. More specifically, the image stabilization may detect maximum feature density rectangular regions within the reference image using a kernel density estimation. These regions may be saved in descending order of the feature densities. The most feature dense regions are used to determine alignment of subsequent raw images.

The image stabilization module 207 the feature-rich alignment regions to identify whether a current frame needs to be stabilized. To do so, the image stabilization module extracts Speeded-Up Robust Features (SURFs) from the reference image and tracks the SURFs in subsequent frames to determine whether a majority of the tracked features remain stationary or exhibit consistent affine transformations. If the features are stationary in the current frame, then stabilization is not necessary.

Otherwise, the image stabilization module 207 aligns the image based on the identified alignment region of the reference frame. While aligning the region, the image stabilization module finds an affine transformation matrix for transforming the features from the tracked position in a current frame to the aligned position based on the reference frame.

In one embodiment, the detector 210 may model background states for each pixel using an adaptive resonance theory (ART) network. That is, each pixel may be classified as depicting scene foreground or scene background using an ART network modeling that pixel. Of course, other approaches to distinguish between scene foreground and background may be used.

Additionally, the detector 210 may be configured to generate a mask used to identify which pixels of the scene are classified as depicting foreground and, conversely, which pixels are classified as depicting scene background. The detector 210 then identifies regions of the scene that contain a portion of scene foreground (referred to as a foreground "blob" or "patch") and supplies this information to subsequent stages of the pipeline. Additionally, pixels classified as depicting scene background may be used to generate a background image modeling the scene.

In one embodiment, the detector 210 may be configured to detect the flow of a scene. For example, once the foreground patches have been separated, the detector 210 examines, from frame-to-frame, any edges and corners of all foreground patches. The detector 210 identifies foreground patches moving in a similar flow of motion as most likely belonging to a single object or a single association of motions. As the detector 210 identifies foreground objects, it sends this information to the tracker 215.

The tracker 215 may receive the foreground patches produced by the detector 210 and generate computational models for the patches. For example, the tracker 215 may be configured to use this information, and each successive frame of raw-video, to attempt to track the motion of, for example, a foreground object depicted by a given foreground patch as it moves about the scene. That is, the tracker 215 provides continuity to other elements of the computer vision engine 135 by tracking the foreground object from frame-to-frame. The tracker 215 may also calculate a variety of kinematic and/or appearance features of a foreground object, e.g., size, height, width, and area (in pixels), reflectivity, shininess rigidity, speed velocity, etc.

The context event generator 220 may receive the output from other stages of the pipeline. Using this information, the context processor 220 may be configured to generate a stream of context events regarding objects tracked (by tracker component 210). For example, the context event generator 220 may package a stream of micro feature vectors and kinematic observations of an object and output this to the machine learning engine 140, e.g., a rate of 5 Hz. In one embodiment, the context events are packaged as a trajectory. As used herein, a trajectory generally refers to a vector packaging the kinematic data of a particular foreground object in successive frames or samples. Each element in the trajectory represents the kinematic data captured for that object at a particular point in time. Typically, a complete trajectory includes the kinematic data obtained when, for example, an foreground object is first observed in a frame of video along with each successive observation up to when leaves the scene (or becomes stationary to the point of dissolving into the frame background). Accordingly, assuming computer vision engine 135 is operating at a rate of 5 Hz, a trajectory for an object is updated every 200 milliseconds, until complete. The context event generator 220 may also calculate and package the appearance data of every foreground objects by evaluating various appearance attributes such as shape, width, and other physical features and assigning each attribute a numerical score.

The computer vision engine 135 may take the output from the components 205, 210, 215, and 220 describing the motions and actions of the tracked objects in the scene and supply this information to the machine learning engine 140 through the event bus 230. Illustratively, the machine learning engine 140 includes a classifier module 235, a semantic module 240, a mapper module 245, cognitive module 250, a cortex module 270, and a normalization module 265.

The classifier module 235 receives context events such as appearance data from the computer vision engine 135 and maps the data on a neural network. In one embodiment, the neural network is a combination of a self-organizing map (SOM) and an ART network. The data is clustered and combined by features occurring repeatedly in association with each other. Then, based on those recurring types, the classifier module 235 defines types of objects. For example, the classifier module 235 may define foreground patches that have, for example, a high shininess rigidity and reflectivity as a Type 1 object. These defined types then propagate throughout the rest of the system.

The cortex module 270 receives kinematic data from the computer vision engine 135 and maps the data on a neural network, such as a SOM-ART network). In one embodiment, the SOM-ART network clusters kinematic data to build common sequences of events in a scene. In another embodiment, the SOM-ART network clusters kinematic data from interacting trajectories to build common interactions in a scene. By learning common sequences of events and interactions within the scene, the cortex module 270 aids the machine learning engine in detecting anomalous sequences and interactions.

The mapper module 240 uses these types by searching for spatial and temporal correlations and behaviors across the system for foreground patches to create maps of where and when events are likely or unlikely to happen. In one embodiment, the mapper module 240 includes a temporal memory ART network, a spatial memory ART network, and statistical engines. For example, the mapper module 240 may look for patches of Type 1 objects. The spatial memory ART network uses the statistical engines to create statistical data of these objects, such as where in the scene do these patches appear, in what direction do these patches tend to go, how fast do these patches go, whether these patches change direction, and the like. The mapper module 240 then builds a neural network of this information, which becomes a memory template against which to compare object behaviors. The temporal memory ART network uses the statistical engines to create statistical data based on samplings of time slices. In one embodiment, initial sampling occurs at every thirty minute interval. If many events occur within a time slice, then the time resolution may be dynamically changed to a finer resolution. Conversely, if fewer events occur within a time slice, then the time resolution may be dynamically changed to a coarser resolution.

In one embodiment, the semantic module 245 identifies patterns of motion or trajectories within a scene and analyzes the scene for anomalous behavior through generalization. By tessellating a scene and dividing the foreground patches into many different tessera, the semantic module 245 traces an object's trajectory and learns patterns from the trajectory. The semantic module 245 analyzes these patterns and compares them with other patterns. As objects enter a scene, semantic module 245 builds an adaptive grid and maps the objects and their trajectories onto the grid. As more features and trajectories are populated onto the grid, the machine learning engine learns trajectories that are common to the scene and further distinguishes normal behavior from anomalous behavior.

In one embodiment, the cognitive module 250 includes a perceptual memory, an episode memory, a long term memory, and a workspace. Generally, the workspace provides a computational engine for the machine learning engine 140. For example, the workspace may be configured to copy information from the perceptual memory, retrieve relevant memories from the episodic memory and the long-term memory, and select codelets to execute. In one embodiment, a codelet is a software program configured to evaluate different sequences of events and to determine how one sequence may follow (or otherwise relate to) another (e.g., a finite state machine). More generally, the codelet may provide a software module configured to detect interesting patterns from the streams of data fed to the machine learning engine. In turn, the codelet may create, retrieve, reinforce, or modify memories in the episodic memory and the long-term memory. By repeatedly scheduling codelets for execution, copying memories and percepts to/from the workspace of cognitive module 250, the machine learning engine 140 performs a cognitive cycle used to observe, and learn, about patterns of behavior that occur within the scene.

In one embodiment, the perceptual memory, the episodic memory, and the long-term memory are used to identify patterns of behavior, evaluate events that transpire in the scene, and encode and store observations. Generally, the perceptual memory receives the output of the computer vision engine 135 (e.g., a stream of context events). The episodic memory stores data representing observed events with details related to a particular episode, e.g., information describing time and space details related on an event. That is, the episodic memory 252 may encode specific details of a particular event, i.e., "what and where" something occurred within a scene, such as a particular vehicle (car A) moved to a location believed to be a parking space (parking space 5) at 9:43 AM.

In contrast, the long-term memory may store data generalizing events observed in the scene. To continue with the example of a vehicle parking, the long-term memory may encode information capturing observations and generalizations learned by an analysis of the behavior of objects in the scene such as "vehicles tend to park in a particular place in the scene," "when parking vehicles tend to move a certain speed," and "after a vehicle parks, people tend to appear in the scene proximate to the vehicle," etc. Note, the use of a "vehicle" is provided by way an analogy. Strictly speaking, however, neither the long-term memory nor the episodic memory has any conception of an entity such as "person" or a "vehicle." Instead, these structures store statistical data derived from observations of pixel values that change over time. Thus, the long-term memory stores observations about what happens within a scene with much of the particular episodic details stripped away. In this way, when a new event occurs, memories from the episodic memory and the long-term memory may be used to relate and understand a current event, i.e., the new event may be compared with past experience, leading to both reinforcement, decay, and adjustments to the information stored in the long-term memory, over time. In a particular embodiment, the long-term memory may be implemented as an ART network and a sparse-distributed memory data structure. Importantly, however, this approach does not require the different object type classifications to be defined in advance.

In one embodiment, modules 235, 240, 245, 250, and 270 may be configured to detect anomalies in a scene. That is, each module may be configured to identify anomalous behavior, relative to past observations of the scene. If any module identifies anomalous behavior, it generates an alert and passes the alert through the normalization module 265. For instance, the semantic module 245 detects unusual trajectories using learned patterns and models. If a foreground object exhibits loitering behavior, for example, the semantic module 245 evaluates the object trajectory using loitering models, subsequently generates an alert, and sends the alert to the normalization module 265. Upon receiving an alert, the normalization module 265 evaluates whether the alert should be published.

Figure 3:
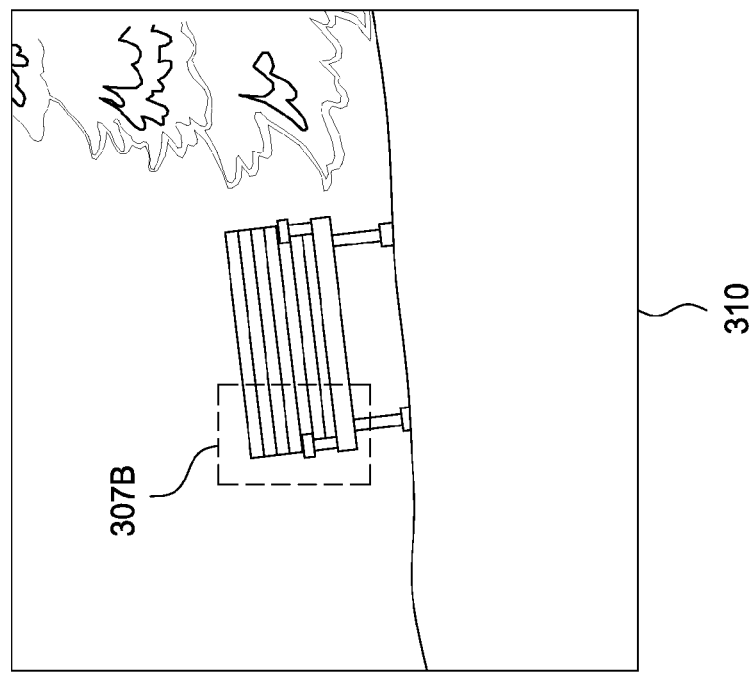
FIG. 3 illustrates graphical representations of a reference image and a current image captured by a camera, according to one embodiment.
Figure 3:
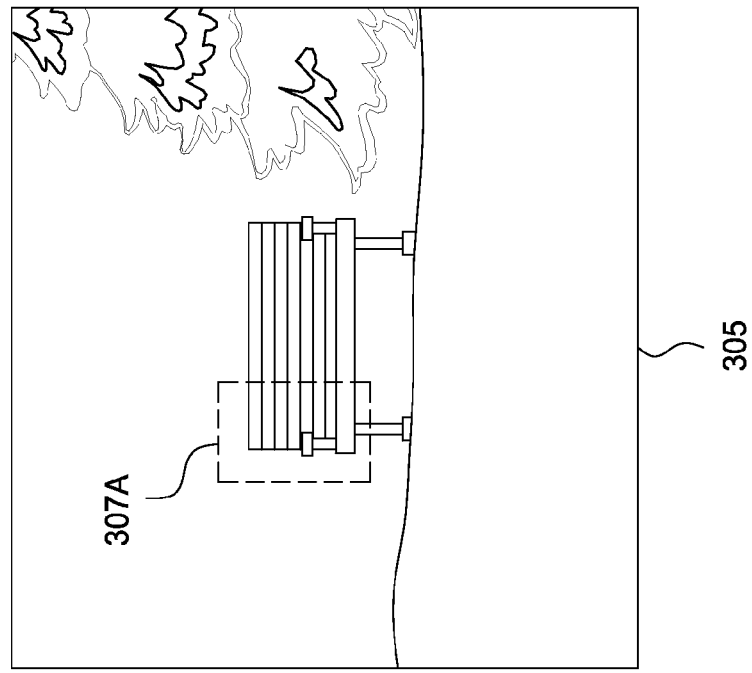

FIG. 3 illustrates graphical representations of a reference image and a current image captured by a camera, according to one embodiment. The reference image 305 and the current image 310 each depict a frame of the given scene: an observed area having a park bench and gravel. As stated, the image stabilization module 207 may obtain a reference image for use in evaluating the stability of subsequently captured raw video images. The initial reference frame may be the first raw camera image. The image stabilization module 207 may periodically update the reference image thereafter (e.g., every five minutes).

When a reference image is obtained or updated, the image stabilization module 207 extracts Speeded-Up Robust Features (SURFs) from the image to ascertain locations within the image having high feature densities, such as in corners, edges, or other contextual information. In one embodiment, the image stabilization module 207 applies uniform kernel density estimation algorithms to determine the most feature dense regions of the image. The image stabilization module 207 uses such regions as alignment regions if stabilization is necessary. Once the alignment regions are identified, the image stabilization module 207 may track the SURFs extracted in the reference frame in subsequently captured frames to detect any changes in the features, such as feature translation, rotation, or scaling. Further, if the identified alignment region provides inadequate results after a stabilization (e.g., due to some of the features in the alignment region corresponding to foreground objects), the image stabilization module 207 may use the next most feature dense alignment region (and so on) for stabilization.

The reference image 305 includes an example alignment region 307a (depicted as a dotted lined box within the frame). The image stabilization module 207 tracks features extracted in the reference frame to detect whether a subsequent image is out of alignment (e.g., the features in a given frame are out of position when compared to the alignment region 307a reference image 305). If the image is out of alignment, the image stabilization module 207 uses the alignment region to estimate an affine transformation matrix to apply in realigning the image. In practice, the alignment region may be smaller than depicted in FIG. 3. For example, experience shows that using alignment regions of 81×81 pixels has yielded good results.

The current image 310 is an example of a frame where the features deviate in position from the reference image 305. Illustratively, the current image 310 depicts the same scene of reference image 305 but with a slight amount of translation and rotation of the captured features. Such deviation may occur, for example, from harmonic motions or vibrations in the surroundings (e.g., by cars driving past the scene causing vibrations, wind, unstable mounting of the camera, etc.). As shown, current image 310 includes an alignment region 307b located in the same position of the frame as the alignment region 307a. Compared to the position of the features within alignment region 307a, the position of the features within the alignment region 307b are rotated. The image stabilization module 207 may detect such rotation (or any other affine transformation) when comparing the SURFs of the reference image 305 to the current image 310 and subsequently determine that the current image 310 needs to be stabilized.

Figure 4:
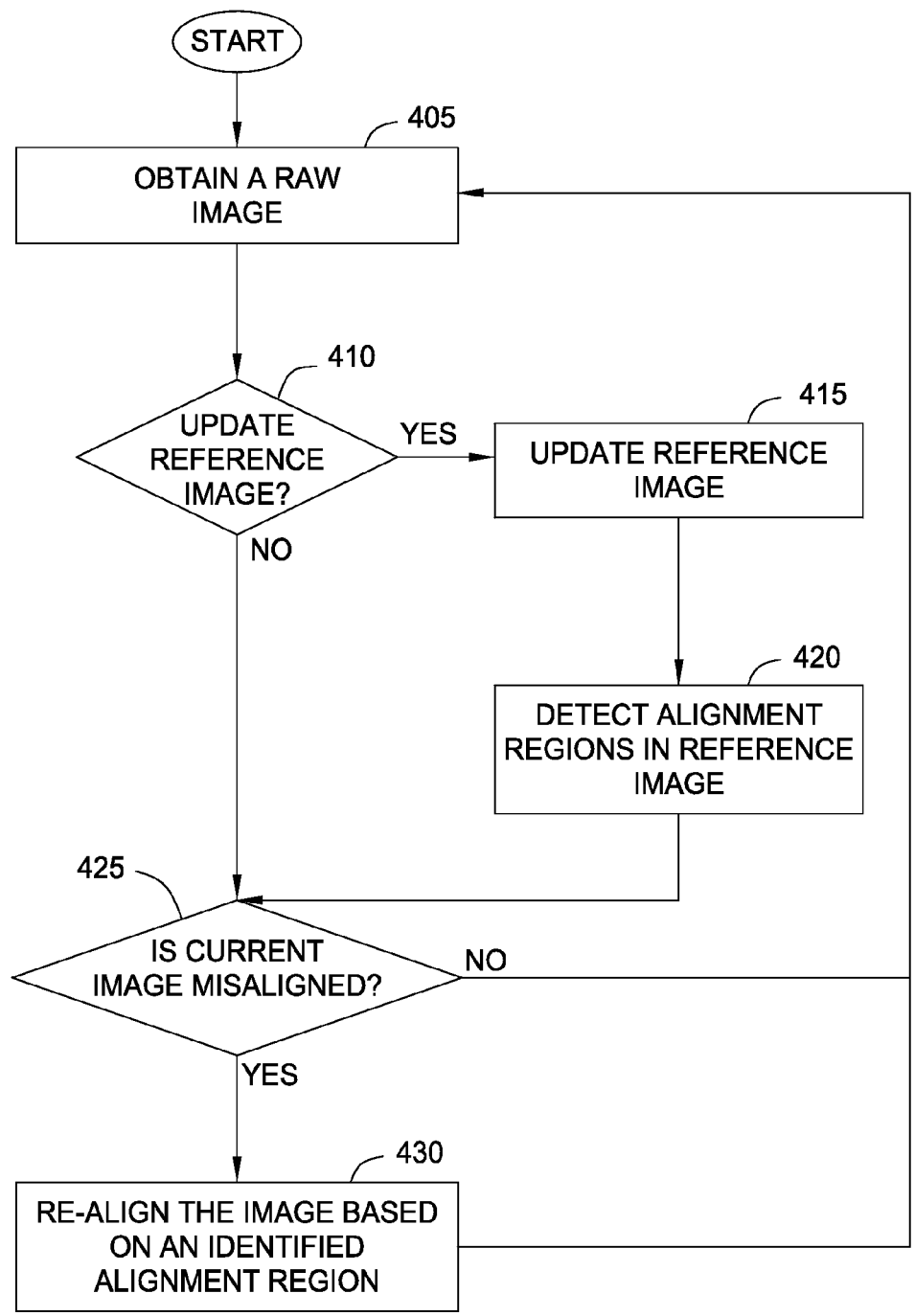
FIG. 4 illustrates a method for stabilizing a misaligned image captured by a camera

FIG. 4 illustrates a method 400 for stabilizing a misaligned frame captured by a camera, according to one embodiment.

Note, experience shows that for method 400 to work effectively, the rate at which video samples are acquired (i.e. the frame rate) must at least match (and preferably somewhat exceed) the characteristic rate at which the vibrations or motions causing the scene instabilities that are being compensated for occur.

Assume that image stabilization module 207 has already obtained an initial reference image, such as upon start-up of the behavioral recognition system, and also assume that initial alignment regions have already been detected. At step 405, the data ingestor 205 receives raw video input (i.e., a currently observed image) from an input source 105. At step 410, the image stabilization module 207 determines whether to update the reference image. For example, the image stabilization module 207 may periodically update the reference image based on the raw video input. The updated reference image may correspond to a realigned image. In another case, the image stabilization module may be configured to search for a new reference image as a current one that registers well with the background model.

After updating the reference image, the image stabilization module 207 detects rectangular alignment regions in the reference image. In one embodiment, the image stabilization module 207 applies a uniform kernel density estimation algorithm across pixel regions of the reference image (e.g., 81×81 regions) to identify the most feature dense regions. In practice, the image stabilization module 207 may identify up through four of such regions, although the image stabilization module 207 may be configured to identify more. The image stabilization module 207 may designate the regions having the densest features as the alignment regions. Once the alignment regions are identified, the image stabilization module 207 may rank the regions in descending order for use in the image stabilization.

At step 425, the image stabilization module 207 determines whether the currently observed image is not properly aligned relative to the reference frame. That is, if a majority of tracked features of the current frame are in the same location when comparing the reference frame to the current frame, then the image is most likely in proper alignment, and stabilization is not required. However, if the image stabilization module 207 detects affine transformations on the features in the frame, such as rotation, transformation, and scaling, then the image stabilization module 207 may need to stabilize the frame. In one embodiment, the pyramidal Lucas-Kanade optical flow analysis method may be used to track the features.

If so, the image stabilization module 207, using the designated alignment region, stabilizes the current image using an alignment algorithm. The algorithm stabilizes the current image by estimating an affine transformation matrix for the entire image based on the designated alignment region. The algorithm uses the affine transformation matrix to warp the unstable image until the image is stable. The identified affine transformation matrix allows the image stabilization module 207 to transform the features from a tracked position in the current image to an aligned position based on the reference image.

To obtain the estimated affine transformation matrix, the image stabilization module 207 passes four parameters to the alignment algorithm: 1) a number of iterations to align the designated alignment region; 2) an epsilon difference ($\epsilon$) in horizontal translation between the alignment region of the current image and the alignment region of the reference image; 3) an $\epsilon$ of the vertical translation between the alignment region of the current image and the alignment region of the reference image; and 4) an $\epsilon$ of the rotation between the alignment region of the current image and the alignment region of the reference image. In one embodiment, the inverse compositional method may be used to adjust the designated alignment region. Generally, the algorithm uses gradient descent analysis to reduce translation and rotation errors. That is, the algorithm uses the given parameters to compute a steepest descent matrix. The steepest descent matrix is a gradient matrix in two dimensions. When the current image is perfectly aligned with the reference image, the horizontal and vertical gradient values are equal to zero. At every iteration, the alignment algorithm readjusts the alignment region such that the error values move towards the $\epsilon$ values as closely as possible. In one embodiment, perturbation theory methods may also be used for further refinement of stabilizing the image in the event that the alignment regions at each iteration stay within local minima (i.e., out of alignment with the reference image). Further, at each iteration, the algorithm updates the estimated affine transformation matrix required to achieve alignment. After completing the specified iterations (or once the translation and rotation values are below the $\epsilon$ values), the algorithm applies the resulting affine transformation matrix on the entire current image.

Further, in one embodiment, the image stabilization module 207 may assign a statistical weight to the alignment region after realigning an image. Doing so allows the image stabilization module 207 to determine whether the reference image and the aligned image fall within a configurable tolerance, e.g., how well the features of the aligned image registers with the reference image. For example, although the image stabilization module 207 may initially determine an alignment region having the densest features in the image, the region may be of limited usefulness due to moving foreground objects contributing to the density of the region. As a result, the initial alignment region may yield poor stabilization.

The statistical weight may be calculated based on any registration error based on a measure of the translation, rotation, and scaling required by the affine transformation matrix. If the registration error is outside of a configured amount (again measured relative to the registration of alignment region and the current frame) then the next most feature dense alignment region may be used to align the current frame. Therefore, if a particular alignment region continuously produces results with low error (e.g., relative to the registration of the alignment region of the reference image and the current image), the image stabilization module 207 may reinforce the statistical weight of the region. Conversely, if the alignment region begins to produce results with high error, the image stabilization module 207 may reduce the statistical weight of the region. More generally, if the current region does not stabilize the image within the given fractional tolerance, its statistical significance is reduced. On the other hand, the significance of the useful region that stabilizes the image within the given tolerance is increased. Regions are continuously sorted based on their statistical weight and the region with the highest statistical weight is always used first for its alignment within the current image.

Further, as the computer vision engine needs to process video data in near-real time, the image stabilization module 207 may support a number of tunable parameters to balance system performance with the quality of frame stabilization. For example, the image stabilization module 207 may be configured with an allowed or target time limit. If the time required to stabilize the last n frames is below the limit, then the image stabilization module 207 may allow more computations to get better stabilization, particularly more time to determine the affine transformation matrix needed to transform the features in the current image to match the reference image. More time for alignment allows more stabilization to occur. On the other hand, if the time for stabilizing an image exceeds the allowed time limit, then the image stabilization module 207 may reduce the number of computations performed to determine the affine transformation matrix. Doing so allows the image stabilization module to keep up with the real-time demands of the video surveillance system.

As described, embodiments presented herein provide techniques for stabilizing an image that is out of alignment relative to a reference image previously captured by a video camera. The computer vision engine stabilizes misaligned images in a given scene prior to separating background objects from foreground objects in the scene. Advantageously, the resulting images are consistent and allow the computer vision engine and the machine learning engine to properly analyze images captured in a video stream.

While the foregoing is directed to embodiments of the present invention, other and further embodiments of the invention may be devised without departing from the basic scope thereof, and the scope thereof is determined by the claims that follow.

What is claimed is:

1. A method for stabilizing camera images captured by a video recording device and evaluated by a video analytics application, the method comprising:
identifying candidate regions within a reference frame to use in aligning a stream of frames captured by a video camera, wherein the candidate regions are sorted in descending order by a density of tracked features within each candidate region;
designating a candidate region having a highest density of tracked features among the candidate regions as an alignment region for each captured frame; and
upon determining that the stream is unstable based on the tracked features in a current frame being misaligned relative to the corresponding features of the reference frame:
determining an affine transformation matrix for the current frame based on the alignment region,
warping the current frame using the affine transformation matrix such that the features in the alignment region of the current frame match the corresponding features of the reference frame,
identifying a registration error between the warped current frame and the reference frame, and
upon determining that the registration error is within a tolerance threshold, designating the warped current frame as a stabilized frame.

2. The method of claim 1, wherein the affine transformation matrix is determined over a specified number of iterations based on a vertical translation, a horizontal translation, and a rotation of the features within the alignment region of the reference frame and the current frame using a gradient descent analysis.

3. The method of claim 2, wherein the number of iterations is increased and thresholds of the vertical translation and of the horizontal translation are decreased based on a previous affine transformation matrix being determined under a specified length of time.

4. The method of claim 1, wherein the reference frame is an initial raw frame captured by the camera on start-up.

5. The method of claim 1, further comprising, updating the reference frame to the stabilized frame.

6. The method of claim 1, further comprising, assigning a statistical weight to the alignment region based on registration error.

7. The method of claim 6, further comprising, upon determining that the registration error is not within the tolerance threshold:
reducing a statistical weight of the alignment region; and
designating a next statistically significant candidate region as the alignment region.

8. A non-transitory computer-readable storage medium storing instructions, which, when executed on a processor, performs an operation for stabilizing camera images captured by a video recording device and evaluated by a video analytics application, the operation comprising:
identifying candidate regions within a reference frame to use in aligning a stream of frames captured by a video camera, wherein the candidate regions are sorted in descending order by a density of tracked features within each candidate region;
designating a candidate region having a highest density of tracked features among the candidate regions as an alignment region for each captured frame; and
upon determining that the stream is unstable based on the tracked features in a current frame being misaligned relative to the corresponding features of the reference frame:
determining an affine transformation matrix for the current frame based on the alignment region,
warping the current frame using the affine transformation matrix such that the features in the alignment region of the current frame match the corresponding features of the reference frame,
identifying a registration error between the warped current frame and the reference frame, and
upon determining that the registration error is within a tolerance threshold, designating the warped current frame as a stabilized frame.

9. The non-transitory computer-readable storage medium of claim 8, wherein the affine transformation matrix is determined over a specified number of iterations based on a vertical translation, a horizontal translation, and a rotation of the features within the alignment region of the reference frame and the current frame using a gradient descent analysis.

10. The non-transitory computer-readable storage medium of claim 9, wherein the number of iterations is increased and thresholds of the vertical translation and of the horizontal translation are decreased based on a previous affine transformation matrix being determined under a specified length of time.

11. The non-transitory computer-readable storage medium of claim 8, wherein the reference frame is an initial raw frame captured by the camera on start-up.

12. The non-transitory computer-readable storage medium of claim 8, further comprising, updating the reference frame to the stabilized frame.

13. The non-transitory computer-readable storage medium of claim 8, further comprising, assigning a statistical weight to the alignment region based on registration error.

14. The non-transitory computer-readable storage medium of claim 13, further comprising, upon determining that the registration error is not within the tolerance threshold:
reducing a statistical weight of the alignment region; and
designating a next statistically significant candidate region as the alignment region.

15. A system comprising:
a processor; and
a memory hosting an application, which, when executed on the processor, performs an operation for stabilizing camera images captured by a video recording device and evaluated by a video analytics application, the operation comprising:

identifying candidate regions within a reference frame to use in aligning a stream of frames captured by a video camera, wherein the candidate regions are sorted in descending order by a density of tracked features within each candidate region;

designating a candidate region having a highest density of tracked features among the candidate regions as an alignment region for each captured frame; and upon determining that the stream is unstable based on the tracked features in a current frame being misaligned relative to the corresponding features of the reference frame:

determining an affine transformation matrix for the current frame based on the alignment region, warping the current frame using the affine transformation matrix such that the features in the alignment region of the current frame match the corresponding features of the reference frame, identifying a registration error between the warped current frame and the reference frame, and upon determining that the registration error is within a tolerance threshold, designating the warped current frame as a stabilized frame.

16. The system of claim 15, wherein the affine transformation matrix is determined over a specified number of iterations based on a vertical translation, a horizontal translation, and a rotation of the features within the alignment region of the reference frame and the current frame using a gradient descent analysis.

17. The system of claim 16, wherein the number of iterations is increased and thresholds of the vertical translation and of the horizontal translation are decreased based on a previous affine transformation matrix being determined under a specified length of time.

18. The system of claim 15, wherein the reference frame is an initial raw frame captured by the camera on start-up.

19. The system of claim 15, further comprising, updating the reference frame to the stabilized frame.

20. The system of claim 15, further comprising, assigning a statistical weight to the alignment region based on registration error.

21. The system of claim 20, further comprising, upon determining that the registration error is not within the tolerance threshold:

reducing a statistical weight of the alignment region; and designating a next statistically significant candidate region as the alignment region.

22. A method for stabilizing camera images captured by a video recording device, the method comprising:

identifying candidate regions within a reference frame to use in aligning a frame captured by a video camera, wherein the candidate regions are sorted in descending order by a density of tracked features within each candidate region;

designating a candidate region having a highest density of tracked features among the candidate regions as an alignment region for each captured frame; and upon determining that the stream is unstable based on the tracked features in a current frame being misaligned relative to the corresponding features of the reference frame, aligning the current frame.

23. The method of claim 22, wherein the current frame is aligned using perturbation theory methods.

* * * * *